United States Patent [19]
Allison et al.

[11] Patent Number: 5,912,633
[45] Date of Patent: Jun. 15, 1999

[54] MAINS SIGNALLING SYSTEMS

[75] Inventors: Robert Joseph Allison, Basingstroke; David Roger Scholefield, Winchester, both of United Kingdom

[73] Assignee: Remote Metering Systems Limited, Hants, United Kingdom

[21] Appl. No.: 08/793,070

[22] PCT Filed: Aug. 17, 1995

[86] PCT No.: PCT/GB95/01954

§ 371 Date: May 16, 1997

§ 102(e) Date: May 16, 1997

[87] PCT Pub. No.: WO96/06478

PCT Pub. Date: Feb. 29, 1996

[30] Foreign Application Priority Data

Aug. 18, 1994 [GB] United Kingdom .................. 9416688

[51] Int. Cl.⁶ .................................................. G08B 23/00
[52] U.S. Cl. .............................. 340/870.02; 340/310.01; 340/825.18
[58] Field of Search ................ 340/870.02, 870.03, 340/825.18, 825.52, 310.01, 825.02, 825.06, 310.03

[56] References Cited

U.S. PATENT DOCUMENTS

| | | | |
|---|---|---|---|
| 4,302,750 | 11/1981 | Wadhwani et al. | 340/870.02 |
| 4,937,569 | 6/1990 | Trask et al. | 340/825.52 |
| 4,968,970 | 11/1990 | Laporte | 340/310.03 |
| 5,032,833 | 7/1991 | Laporte | 340/870.02 |

FOREIGN PATENT DOCUMENTS

| | | |
|---|---|---|
| 0 062 870 | 10/1982 | European Pat. Off. . |
| 0 395 495 | 10/1990 | European Pat. Off. . |
| 2 176 972 | 1/1987 | United Kingdom . |

*Primary Examiner*—Michael Horabik
*Assistant Examiner*—Albert K. Wong
*Attorney, Agent, or Firm*—Lowe Hauptman Gopstein Gilman & Berner

[57] ABSTRACT

A control unit for a remote metering system of a mains supply system having plural consumer meter units arranged so messages can pass between the meter units and the control unit includes a router for determining routes to selected meter units via intermediate ones of the meter units. The router for each selected meter includes (1) a route table containing plural possible routes to the selected meter; (2) a route selector for selecting from the table different, previously untried routes; and (3) a route table updater. The untried routes are selected by the selector until one of them is successful, or until all untried routes are found to be unsuccessful. The route table updater generates a fresh route and inserts it into the table by displacing a single route from the table in response to the route selector detecting that all the routes in the table are found to be unsuccessful.

18 Claims, 2 Drawing Sheets

MAINS SIGNALLING SYSTEMS

The present invention relates primarily to mains signalling systems, though it is also applicable to other systems having similar characteristics. (The term "main" applies primarily to the final consumer voltage portions of an electricity supply network, though the signalling can also extend over the higher voltage distribution parts of the network.) Such signalling is termed mains, mainsborne, or power line carrier (PLC) signalling.

Remote Metering

A major application of mains signalling is remote meter reading, operated by electricity generating and distribution companies (electricity utilities). The term "remote meter reading" refers to what is normally the major function of such systems, but they may also be concerned more generally with load and system control. Also, while they will usually be concerned primarily with electricity meters, gas and other meters can in principle be coupled to the mains for this purpose (preferably through electricity meters).

A typical simple remote meter reading system will have a central station or local controller (which can conveniently be located at a distribution transformer) which communicates over the mains with the meters (meter stations) of the various premises (largely household or domestic and small commercial) on the mains. Such systems have two major problems: noise and attenuation.

Mains noise arises from loads being switched on and off and the inherent characteristics of certain types of loads. The noise problem can generally be overcome by a variety of known techniques, such as error detection and correction techniques, requiring acknowledgement of reception, and repetition of lost messages. (Some of these techniques also deal with problems of message collision.)

Dissipation or attenuation at the preferred signal frequencies is significant; it is dependent on the particular operating conditions of the mains network and varies according for example to the loading of the network. The attenuation will often be irregular; there may for example be potential "dead spots", due eg to signal reflections, close to the signal source while communication to more distant locations is still reasonably reliable.

A system which largely overcomes these problems has been proposed in our earlier patent application Ser. No. PCT/GB94/01391, WO 95/01030. In that system, which we will for convenience call the "standard system", substantially all meters have a repeater function. The present system is a broadly a development of or improvement on that system.

The topology of the standard system will normally be branched. That is, the central station will normally be able to communicate directly with several meters, each of those will normally be able to communicate with several further meters, and so on. (The topology of the communication system is somewhat abstract, and must be distinguished from the physical or network topology of the mains network which supports the communication system. We will normally be concerned with the former, and will use the term "topology" alone for the former.)

A major feature of the standard system is that the message routing—ie the determination of the routes which messages take through the network—is determined substantially entirely by the central station. This is the only station with any significant knowledge of the topology of the system, and is also the only station which can initiate a message.

The central station includes, in each message, a route in the form of a meter list—a list of the meters through which the message is to pass. To read a meter (or otherwise communicate with it), the central station sends out a message to the meter, which inserts its reading into the message and sends it back to the centre! station. For present purposes, the route—the meter list—can be taken as remaining unchanged in the message throughout the message's journey to the destination meter and back again to the central station. (In fact, the standard system preferably uses slight variations on this.)

Topology Monitoring and Use

The standard system can readily be made adaptive to changes of topology. This is particularly important for mains meter reading. The transmission characteristics of the mains network are liable to change (over time periods of the order of minutes to hours). Also, there will be occasional changes in the number and locations of the meters of the system, and the mains network itself may be extended or modified over time. All these types of changes will change the topology of the system.

The operations of the standard system can be broadly divided into two classes. First, there is topology determination; that is, sending SEARCH messages designed primarily to discover or monitor the topology of the system—discovering which units can communicate with which and the appearance or disappearance of meters. (The topology determination mode may be split into two sub-modes, initializing and maintenance.) Second, there is direct messaging; that is, the sending of messages to particular meters with the primary purpose being to transfer specific information between the central station and that meter. (The main use of direct messaging will be to read the meter, but it may also be used for other purposes, eg to change a tariff at that meter). Direct messaging requires knowledge of the topology.

To determine the topology, the central station can send out search messages which request identification from meters receiving them. (Various details of this are described in the standard system.) The central station can therefore gradually construct a map of the system. The topology of the system can then be continuously maintained as a background process, so that changes in it (eg meters gaining or losing communication with each other or appearing or disappearing) can be tracked.

In the standard system, the map is typically stored in the local controller in the form of a topology table, which is essentially a list of all directly communicating pairs of units. When the local controller wants to send out a message to a meter, it uses the topology table to determine a path to that meter, eg by starting with the entry for that unit and backtracking up the table until an entry for the local controller is reached.

It may happen that the local controller finds difficulty in communicating with a meter; it may get no response after several re-sends, or it may have to re-send for most messages to that meter. In that case, it uses the topology table to try to find an alternative route to the meter.

Route Optimization

It is desirable for the route to be optimal, mainly to maximize the chances of message reaching its destination (and returning therefrom), but also to minimize message density in the system. This requires an algorithm for determining an optimal route based on the hop qualities, and some form of hop quality evaluation.

There is a well-known algorithm for determining the shortest route through a network where the lengths of the connections between the nodes are given. To apply this algorithm, a suitable measure of hop or path "length" or cost must be used. It is convenient to take this as inversely related to the hop quality.

Hop quality can be determined by various techniques. The receiving unit can measure the signal strength, or a noise signal can be deliberately added to the mains system to discover which hops fail as a result. The proportion of attempted transmissions over the hop which are successful can be determined. Each unit can record all messages which it receives (including those which are directed to other units) and, when it receives a message for itself, report the results to the local controller as part of the return message. Test messages can be sent repeatedly and the number received monitored (a technique not described in the standard system).

All these techniques have significant disadvantages. Signal strength measurement requires substantial elaboration of the receiving circuitry in every unit. Using noise signals requires noise signal generators and reliable techniques for controlling them. Measuring the proportion of attempted transmissions over a hop which are successful yields information only about those hops which are actually being used, and is also slow. If all units are required to record all messages which they receive, this requires every unit to maintain a list of all units from which it receives messages together with counts of the numbers of those messages, and considerably increases the amount of information which has to be included in messages. Sending repeated test messages greatly increases the number of messages being sent, and so reduces the capacity of the system.

These various techniques for measuring hop quality thus all have significant disadvantages. We have also realized at the information which they yield is inherently unreliable, as it is generally obtained from statistically small samples, and, as the hop qualities change unpredictably with time, the information will normally be out of date to an appreciable extent. In addition, frequent recalculation of the optimum routes from the hop qualities may impose an undue computational load on the local controller.

A further technique for determining routes through the network is described in Schlumberger, EP 0 395 495 A. In that system, a set of maps are generated for different times, typically for 2 or 3 periods a day for some 2 months, by analysis of network conditions for cyclic repetitions, and are then selected at the appropriate times thereafter. Each map consists of a list or set of paths for all the meters in the network, so describing the network. Each map is similarly subdivided into a set of "stacks" each of which is dedicated to a unique time slice for which the conditions of the network are constant. Each stack contains lists of different possible paths for each meter, together with data characterizing the time period and/or network conditions when the map was made.

When a message is to be sent to a particular meter, the appropriate map is selected, a suitable stack is selected from that map, and the top path from the path list for that meter is chosen. If the message does not reach the meter and return from it (after a suitable number of retries at suitable intervals), that path is discarded from the top of the path list, the remaining paths in the path list are moved up, and the new top path is chosen. If no path in the path list succeeds in reaching the meter, a global topology determination is made, to investigate the topology of the network. Assuming that the meter is still present and reachable, this will result in a path to it being found, and this path will be entered in the path list for that meter.

The global topology determination uses special search-type messages to determine the topology of the entire network in detail. From this information, a variety of paths to all accessible meters can be generated. This allows any meter for which the path list is Not full to have new paths added to its path list. Most of the path lists will therefore be kept reasonably full.

The size of the path lists is kept small, not greater than 3 paths. This is because all the paths in a path list have to be tried before a global topology determination is made, and trying several paths (with retries) takes a very considerable time. Since all the paths in a path list are determined under substantially similar network conditions, there is a good chance that if one path fails (due, eg, to an unexpected change in network conditions), the other paths in the path list will also fail. So it may be worth trying 1 or 2 alternative paths, but not more, before performing a global network topology determination.

The Present Invention

The general object of the present invention is to provide an improved routing technique for the standard system.

Accordingly the present invention provides, in a standard system or the like, routing means comprising, for each meter:

a single route table which contains a plurality of possible routes to the meter;

means for selecting among those routes; and means operative if none of the routes therein enable the meter to be reached for generating a fresh route and inserting it in the table by displacing a single route from the table.

The routes are initially generated from a knowledge of the topology, eg as determined by means of SEARCH messages. These routes are routes which are known to work, in the sense that for at least some of the time they enable communication with the meter to be achieved with reasonable reliability. However, the routes used are not necessarily optimum. Better routes may be possible; but provided that the routes which are in the route tables work, in the sense just given, those routes will be used even though they may not be optimal. The present system thus operates on the basis of practical criteria; routes which are found to work are maintained for future use.

The route to a meter may be picked at random from the route table for that meter. However, it may be desirable to generate merit figures for the various routes in each route table and to try the routes in order of merit. Once a route is found to work, however, that route will generally continue to be used until it ceases to work; only then are other routes in the table tried.

If none of the stored routes to a meter are found to work—that is, if communication with a meter is found to be impossible through any of the stored routes for that meter—then the meter is regarded as lost. In that situation, the topology of the system needs to be investigated more thoroughly. If the topology is maintained in the form of a list of pairs of stations which can communicate directly with each other, then it may be possible to determine a new route from that information. Alternatively, SEARCH messages can be used to re-map the system and to attempt to find the lost meter.

It is worth noting that the routes are preferably stored as complete routes between the local controller and the desired meter. Obviously, it would be possible to split a route to a remote meter into two parts, a first part between the local controller and some intermediate meter and a second part between that intermediate meter and the remote meter. However, it would be dangerous to store, for the remote meter, only the second part of the route and try to complete the route by concatenating that with a route to the intermediate meter Since the topology of the system changes from time to time, some of the routes to the "intermediate" meter may in fact pass through the "remote" meter, so such concatenation could produce circularity. Although additional mechanisms could be introduced to avoid that, they would make the system considerably more complicated.

As discussed above, each message includes a meter list which defines its route through the system. In the basic form of the standard system, this meter list is maintained unchanged throughout the life of the message. It is pointed out in the description of the standard system that addresses can be deleted from the meter list on the return journey of the message from the meter back to the local controller. This can of course be done in the present system.

A further variant is also described in the standard system, where addresses are deleted one by one from the meter list in the message on its outbound (outward) journey and copied into the meters through which the message passes. On the return journey of the message, each meter though which it passes uses the retained address to forward the message to the next meter on its return journey to the local controller.

If, in the present system, the local controller may send out a message before the previous message has returned to it (or sufficient time has elapsed for it to be certain that the previous message has been lost), the use of this last variant may cause a minor difficulty. The reason is similar to the reason why the stored routes are preferably complete routes between the local controller and the desired meter. If a message to one meter is sent out and then a message to another meter is sent out before the first message has returned, the second message may change the return route for the first. However, although in this situation the return route may be unnecessarily lengthened, it is unlikely (except in very exceptional circumstances) to become circular. (In the standard system, this problem is negligible, because all routes are optimized in that system.)

SPECIFIC EMBODIMENT

A communication system embodying the invention will now be described, by way of example, with reference to the drawings, in which.

MAINS NETWORK AND SYSTEM TOPOLOGY

Figure 1:
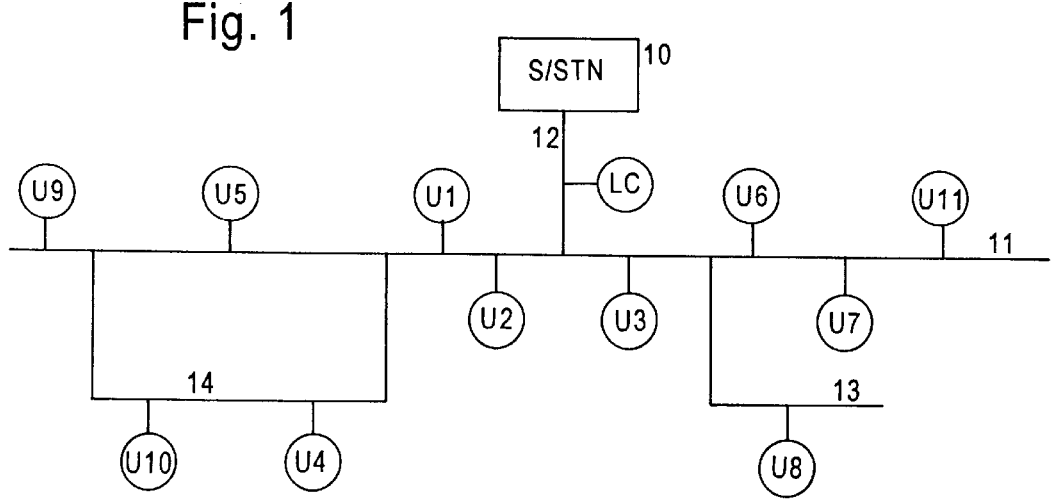
FIG. 1 shows a mains power distribution network and metering system.

FIG. 1 shows a mains network powered from a substation 10. The network comprises a main branch 11 connected to the substation 10 via a line 12, a second branch 13, and a loop branch 14. A central station (local controller) LC is connected to the network adjacent to the substation 10, and various user consumption meters U1–U11 are connected throughout the network as shown. All the meters can also act as relay units. In practice, the mains network will typically extend over an area of the order of 1 km in diameter, and the number of meters will typically be in the region of 100 to 1000.

Figure 2:
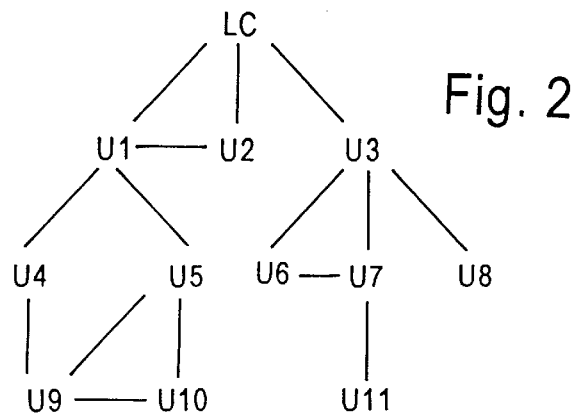
FIG. 2 shows the topology of the FIG. 1 system.

FIG. 2 shows a typical topology for this network. The local controller LC can communicate with meters U1–U3; meter U1 can communicate onwards with meters U4 and U5; and so on. This tree corresponds roughly with the physical closeness of the meters in the physical network of FIG. 1, but the correspondence will in general not be exact. In practice, the maximum path length, ie the maximum number of hops required for the local controller to reach a meter, will typically be 3 or 4. In some systems, however, the number of hops required to reach the most remote meter may be considerably greater than that.

Message Format and Transmission

To read the contents of a meter or to control it, the local controller sends a message to the meter, and the meter returns the message suitably modified. The message return occurs for all messages, acting as an acknowledgement so that the local controller knows that the message has been received. (If no message return occurs, the local controller does not know whether the message was lost on the outward or return journeys, and automatically re-sends the message). The message format comprises three main fields: a command field, a route field, and a data field.

The route field defines the path which the message is to take through the system from the local controller to the meter and back again, and comprises a control subfield and a meter list—a sequence of meter addresses defining that path. The control subfield includes a direction indicator (eg 0 for outbound (outward) and 1 for inbound (inward, return)), a meter list length, and a marker which is effectively moved along the meter list as the message moves through the system to indicate the next meter which is to receive it as the message passes through the system.

Thus for a message being sent to meter U7, for example, the data path field will initially consist of a control subfield 0-3-2 and a meter list LC-U3-U7. In the control subfield, the first character, 0, indicates that the message is an outward one, the second is the label sequence length, and the third is the pointer. The following table summarizes the progress of the message:

1: LC→U3 U7
2: LC U3→U7
3: LC U3←U7
4: LC←U3 U7

This shows the four stages in the outward and return journeys of the message, with an arrow instead of the control subfield to indicate both the active address and the direction of travel. At each stage, the message will normally be received by several stations, but only the station which matches the active address accepts and (except for the local controller) retransmits it.

Figure 3:
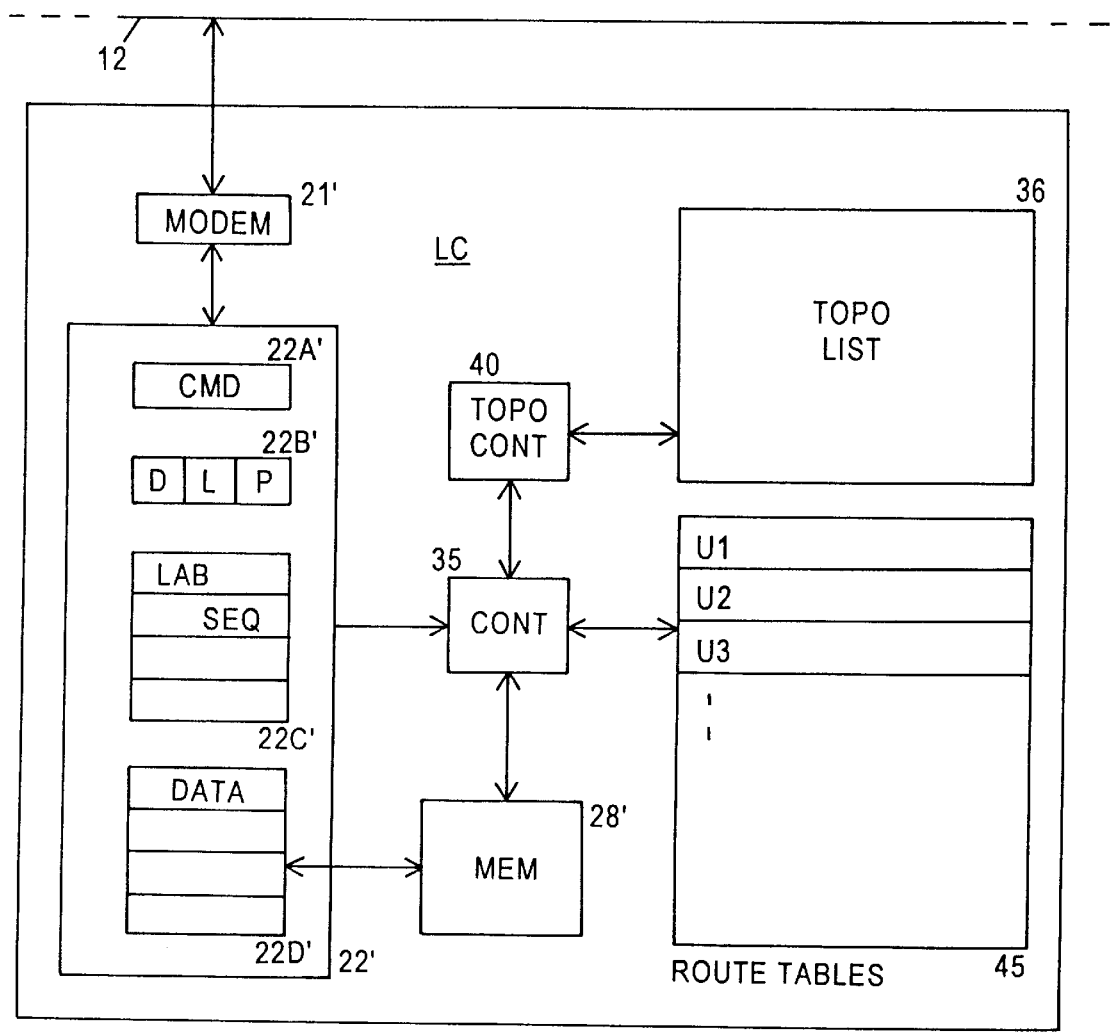
FIG. 3 is a block diagram of the central station of the FIG. 1 system.

FIG. 3 is a block diagram of the local controller LC. A modem 21' couples the mains line 12 to a message assembly and disassembly unit 22'. This has sections for the different fields of the message format: a command section 22A' the command field, a control subsection 22B' for the control subfield, a route subsection 22C' for the meter list subfield, and a data section 22D' for the data field.

The local controller is controlled by a (main) control unit 35. The data section 22D' of the message unit 22' is coupled to a data memory 28' which is coupled to and controlled by the control unit 35. The control unit 35 is also coupled directly to the message unit 22', and specifically to the route subsection 22C'. The control unit is also coupled to a topology control unit 40, which is in turn coupled to a topology list memory 36. (In the standard system, the topology memory 36 is shown as being coupled directly to the control unit 35, but for present purposes it is more convenient to regard it as coupled to the topology control unit 40 as shown here. In effect, we have here simply separated out the topology control functions of the control unit 35 and labelled them as the topology control unit 40.)

In the standard system, the local controller generates various search messages, under the control of the topology control unit 40, to discover the topology of the system, in the form of a list of pairs of units which can communicate with each other with reasonable reliability. This list is stored in the topology memory 36. The topology control unit 40 also causes this list to be maintained and updated as a background process.

In operation, the main control unit 35 generates messages to be sent out to the various meters and processes the messages on their return. To generate a message, all the various sections and subsections of the message unit 22' have to be filled, including in particular the route subsection 22C'. In the standard system, the meter lists for routing control are generated from the list in the topology memory 36. (In the standard system, the control unit 28' is described as performing this task, but it is more convenient to regard this task as being performed by the topology control unit 40.) The meter list may be generated by a simple sequential look-up from the topology memory entries, or by a more elaborate process such as the routing algorithm mentioned above.

The Present System

Figure 4:
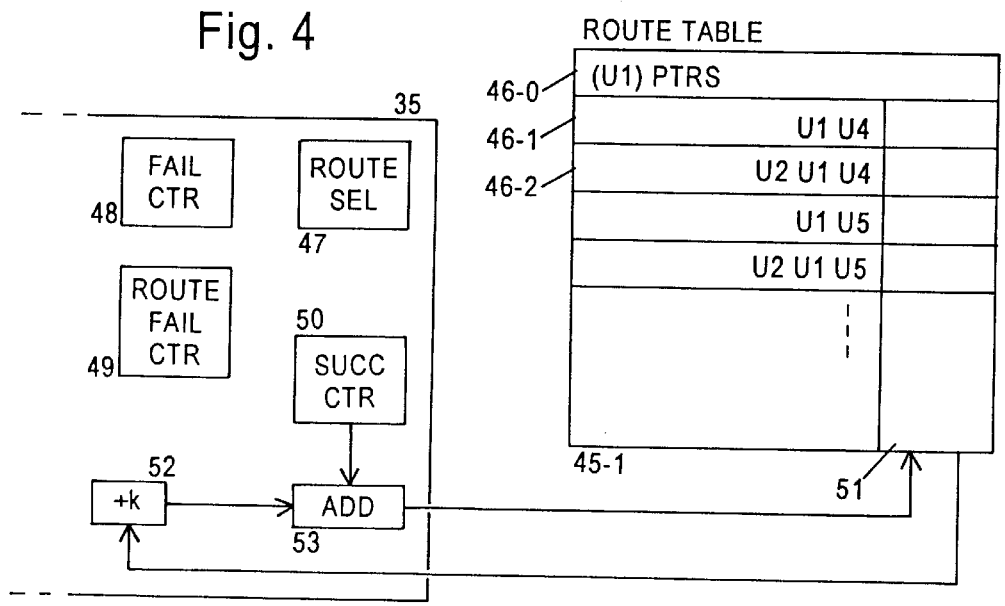
FIG. 4 is a more detailed block diagram of parts of FIG. 3.

In the present system, there is a set of route tables stored in a route tables memory 45, and the main control unit 35 obtains the desired routes from this memory. This memory contains a separate route table for each meter U1, U2, U3, etc. Each route table consists of a list of possible routes by which the local controller can probably reach the meter. FIG. 4 shows the route table 45-1 for meter U9. As shown, this table consists of a set of route storage locations 46-1, 46-2, etc each of which contains a possible route for reaching meter U9.

The routes in a route table are routes which have been found in practice to be effective for reaching the meter. These routes may be generated in any of the ways described in the standard system from the basic topology list 36 and any other available information such as hop quality information.

When the local controller wants to communicate with a meter, the control unit 35 selects the route table for that meter. A route selector 47 (FIG. 4) then selects a route for that meter—ie it selects a location in that route table. In principle, the route selector can select a route at random from the route table, but it is preferable for the route selection to be made according to some form of algorithm, as discussed below.

The route selector 47 maintains a pointer to the selected location (ie the selected route), so that the same route is selected for future communications with that meter. There is a separate pointer for each meter, ie for each route table. The pointer can be regarded as being stored in a pointer location in the table, as indicated at 46-0.

There is also a failure counter 48 which counts the number of attempts which have to be made to communicate with the meter before the local controller successfully receives a message back from the meter. In principle, there can be a single failure counter for all meters. However, it may be desirable for the local controller to try to communicate with a second meter while still awaiting the return of a message from the first. In this case, it is necessary to maintain separate failure counters for the different meters, and each failure count can then be regarded as being stored in a failure count location in the appropriate route table along with the pointers.

If a message is not received back within a suitable time, it is regarded as being lost. The count in the failure counter is incremented by 1, and the message is re-sent. If the count in the failure counter becomes too large, then the route is regarded as no longer valid. The route selector 47 thereupon selects another route from the route table.

Associated with the failure counter 48 there is a route failure counter 49. This counts the number of routes which are found to be invalid. If all routes in the route table are found to be invalid, ie all routes in the table have been tried, each for the appropriate number of times, and communication with the meter has still failed to be achieved, then the meter is regarded as lost. Obviously, both counters 48 and 49 are reset as soon as a message is received back from the meter.

If the meter is lost, this is signalled to the topology control unit 40, for that unit to attempt to generate a new route to the meter or to initiate a search for the meter by means of SEARCH messages. Once a new route has been generated, it is added to the route table 45 for that meter (displacing an existing route if the table is full), and used by the control unit 35 to attempt to communicate with the meter.

The routes in the route table 45 can be arranged in arbitrary order (eg the order in which they are generated). The route selector 47 can then select them in cyclic order, or sequentially starting from the top of the list each time a route which has been successful becomes invalid. However, it is obviously desirable to minimize the number of attempts needed to establish communication with a meter, and it is also generally desirable to minimize the number of hops per message. A better technique for selecting routes from the route table is therefore desirable. This involves arranging the routes in an order of merit. (This can be thought of as involving a re-ordering of the routes in the route table, but in practice it can be achieved by a suitable pointer chaining mechanism.)

With the routes arranged in an order of merit, the route selector 47 preferably selects them sequentially, starting from the top of the list each time a route which has been successful becomes invalid. The chosen route is then the best route at the time when it is chosen. However, as time goes on so the system conditions may change, and some better route may become available even though the current route remains successful. It may therefore also be desirable for the route selector to try routes of lower merit occasionally even though the current route remains valid. This can be triggered by a timer or a message counter.

For the routes to be arranged in order of merit, each route in the list must have a merit figure. A simple form of merit figure is to take the number of hops which a route involves; the fewer hops, the better the merit figure. The choice between routes with the same number of hops can be arbitrary, depending eg on which order they happened to be generated in. This is simple and effective, though for distant meters, routes with few hops will be preferred even though those hops may be long and therefore somewhat less reliable than the hops of some routes with more hops.

Alternatively, the locations in the memory 45 may have extensions 51 for storing explicit merit figures. It is desirable for the algorithm for maintaining the merit figures to be simple. A convenient algorithm is for a success counter 50 to count the number of successful communications with the meter using the currently selected route. When the route finally becomes invalid (as indicated by the count in the failure counter 48 reaching its limit), the merit figure for that route is read out from the appropriate location 51 in the table 45, divided by a constant k in a divider 52, added to the success count from counter 50 in an adder 53, and returned to the merit figure location 51 for that route. The success counter is also reset, to start counting successes for the next route selected by the route selector 47.

There is a separate success counter for each meter, i.e. for each route table; the success count can be regarded as being stored in a success count location in the table, along with the pointers.

The constant k is chosen to be slightly smaller than 1, and can conveniently be of the form $(1-2^{-n})$, eg $7/8$; the division can then be performed by a shift and subtract operation. The effect of this algorithm is to form a kind of running average of the success counts for the times when the route has been selected, with the success counts for recent selections of the route having greater weights than for old selections. The resulting merit figure follows recent success counts, but is not excessively disturbed if, for example, an isolated noise burst makes a normally successful route temporarily invalid. To avoid the merit figure becoming excessively large, an upper limit is set for it.

If a route often requires several attempts, it will usually not be that long before the number of attempts exceeds the limit and becomes invalid. The merit figure for each route thus effectively takes account of the number of attempts which fail for that route (without exceeding the limit set by the failure counter 48).

If desired, the merit figure for each route may be adjusted in accordance with the length of the route. However, this also increases the complexity of the system. It will also be realized that since no hop is likely to be completely reliable, the merit figure will automatically be smaller for unnecessarily long routes.

Other more elaborate techniques can also be used. For example, the system conditions may vary in a roughly regular manner over the course of a day or a week, so that certain routes may be satisfactory, at certain times. The route selector can then be arranged to select routes in a sequence dependent on the time of day. However, all such elaborations increase the complexity of the system.

We claim:

1. A control unit for a remote metering system of a mains supply system having plural consumer meter units, the control and meter units being arranged so messages can pass between the meter units and the control unit, the control unit comprising a router for determining routes to selected meter units via intermediate ones of said meter units, the router comprising for each selected meter:
    a route table containing plural possible routes to the selected meter;
    a route selector for selecting from the table different, previously untried routes, the untried routes being selected by the selector until one of them is successful, or until all untried routes are found to be unsuccessful; and
    a route table updater for generating a fresh route and inserting it into the table by displacing a single route previously in the table from the table in response to the route selector detecting that all the routes in the table are found to be unsuccessful.

2. The control unit of claim 1 wherein the plural possible routes are stored in a single route table.

3. The control unit of claim 1, wherein the router includes locations for storing, for each route, a figure of merit for that route.

4. The control unit of claim 3, further including an adjuster for adjusting the figure of merit for a route in dependence on the quality of that route.

5. The control unit of claim 3 wherein the length of a route is taken as its figure of merit.

6. The control unit of claim 1, wherein the route selector selects routes in cyclic sequence.

7. The control unit of claim 6 further including a failure counter for counting the number of successive failures of successive routes.

8. The control unit of claim 1 further including a failure counter for counting the number of successive failures of a route.

9. The control unit of claim 1 wherein the route selector selects routes in dependence on at least one of the time and conditions in the mains system.

10. In combination, a mains supply system, a remote metering system for the mains supply system including plural consumer meter units and a control unit for the meter units, the control and meter units being arranged so messages can pass between the meter units and the control unit, the control unit comprising a router for determining routes to selected meter units via intermediate ones of said meter units, the router comprising for each selected meter:
    a route table containing plural possible routes to the selected meter;
    a route selector for selecting from the table different, previously untried routes, the untried routes being selected by the selector until one of them is successful, or until all untried routes are found to be unsuccessful;
    a route table updater for generating a fresh route and inserting it into the table by displacing a single route previously in the table from the table in response to the route selector detecting that all the routes in the table are found to be unsuccessful.

11. The combination of claim 10 wherein the plural possible routes are stored in a single route table.

12. The combination of claim 10, wherein the router includes locations for storing, for each route, a figure of merit for that route.

13. The combination of claim 12, further including an adjuster for adjusting the figure of merit for a route in dependence on the quality of that route.

14. The combination of claim 12 wherein the length of a route is taken as its figure of merit.

15. The combination of claim 10, wherein the route selector selects routes in cyclic sequence.

16. The combination of claim 15 further including a failure counter for counting the number of successive failures of successive routes.

17. The combination of claim 10 further including a failure counter for counting the number of successive failures of a route.

18. The combination of claim 10 wherein the route selector selects routes in dependence on at least one of the time and conditions in the mains system.

* * * * *